(12) United States Patent
Reed

(10) Patent No.: US 11,538,327 B1
(45) Date of Patent: Dec. 27, 2022

(54) PROXIMITY ALERT SYSTEM FOR ACCESS BADGES

(71) Applicant: Carl Reed, Bryan's Road, MD (US)

(72) Inventor: Carl Reed, Bryan's Road, MD (US)

( * ) Notice: Subject to any disclaimer, the term of this patent is extended or adjusted under 35 U.S.C. 154(b) by 0 days.

(21) Appl. No.: 17/507,349

(22) Filed: Oct. 21, 2021

(51) Int. Cl.
| | |
|---|---|
| G08B 21/24 | (2006.01) |
| H04W 4/02 | (2018.01) |
| H04W 4/021 | (2018.01) |
| G08B 7/06 | (2006.01) |

(52) U.S. Cl.
CPC ............... G08B 21/24 (2013.01); G08B 7/06 (2013.01); H04W 4/021 (2013.01); H04W 4/023 (2013.01)

(58) Field of Classification Search
CPC .................................. G08B 21/24; G08B 7/06
See application file for complete search history.

(56) References Cited

U.S. PATENT DOCUMENTS

| 8,836,507 B2 | 9/2014 | Thielman et al. |
|---|---|---|
| 9,564,037 B2 | 2/2017 | Belvin et al. |
| 2013/0306738 A1* | 11/2013 | Peterson ............... H05B 47/175 235/494 |
| 2014/0035754 A1* | 2/2014 | Thielman ............. G08B 13/248 340/686.6 |
| 2017/0287311 A1* | 10/2017 | Suryan ................. G08B 25/016 |

* cited by examiner

*Primary Examiner* — Brian Wilson
(74) *Attorney, Agent, or Firm* — Sanchelima & Associates, P.A.; Christian Sanchelima; Jesus Sanchelima

(57) ABSTRACT

A proximity alert system for access badges including a transmitter assembly and a receiver assembly is disclosed herein. The transmitter assembly includes a transmitter housing. The transmitter housing includes a battery compartment. The housing assembly further includes a light to indicate the status of the battery. The housing assembly also includes a transmitter sensor and an adherable side to attach the transmitter assembly to a badge. The receiver assembly includes a receiver housing. The receiver housing includes a battery compartment, a light, a speaker, a motor, a clip and a receiver sensor. The light indicates the status of the battery. The receive sensor communicates with the transmitter sensor. The receiver sensor activates the motor and the speaker if the transmitter assembly and the receiver assembly are far from each other.

7 Claims, 3 Drawing Sheets

PROXIMITY ALERT SYSTEM FOR ACCESS BADGES

BACKGROUND OF THE INVENTION

1. Field of the Invention

The present invention relates to a proximity alert system for access badges and, more particularly, to a proximity alert system for access badges that comprises a transmitter that can be attached to a badge of a user in communication with a receiver, the receiver being able to emit an alarm if the transmitter attached to the badge is further than a desired distance.

2. Description of the Related Art

Several designs for a proximity alert system for access badges have been designed in the past. None of them, however, include a transmitter that can be attached to a badged that communicates with a receiver to alert a user if the badged is far.

Applicant believes that a related reference corresponds to U.S. Pat. No. 8,836,507 issued for an item loss prevention system that uses a magnetic sensor that sounds an alarm if a remote unit separated from the base unit. Applicant believes that another related reference corresponds to U.S. Pat. No. 9,564,037 issued for a mobile device loss prevention system that generates an alert if one device is separated from another linked device. None of these references, however, teach of a proximity alert system for access badges including a transmitter and a receiver that can alarm a user if transmitter and receiver separates further than a desired distance.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a proximity alert system for access badges that includes a transmitter that can easily attach to a badge of a user.

It is another object of this invention to provide a proximity alert system for access badges that includes a receiver that can be attached to a lanyard, badge holder or clothing.

It is still another object of the present invention to provide a proximity alert system for access badges that includes a transmitter assembly that can be attached to an access badge of a work center to avoid a user of losing the access badge.

It is still another object of the present invention to provide a proximity alert system for access badges that includes a transmitter assembly that can be attached to an access/meal card of a college to avoid a student or professor of losing the access meal card.

It is still another object of the present invention to provide a proximity alert system for access badges that includes a transmitter assembly that can be attached to an library card of a college to avoid a student or professor of losing the library card.

It is still another object of the present invention to provide a proximity alert system for access badges that emits an alarm if a transmitter attached to a badge separates further than a desired distance from a receiver, avoiding a user to lose the badge.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
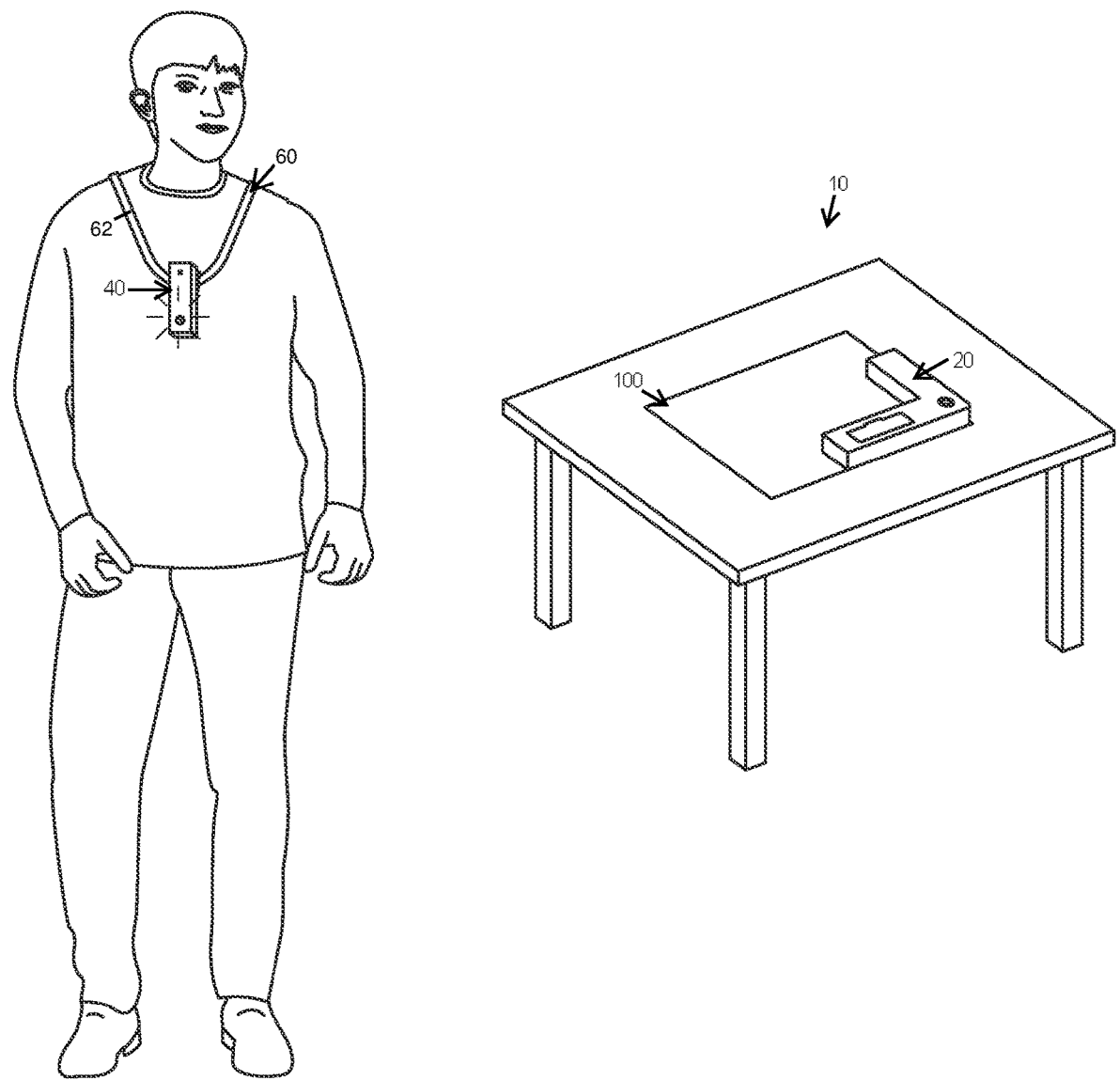
FIG. 1 represents an isometric operational view of the present invention 10. A receiver assembly 40 is alerting a user that a transmitter assembly 20 that is adhered to a badge 100 is being left behind.
Figure 2:
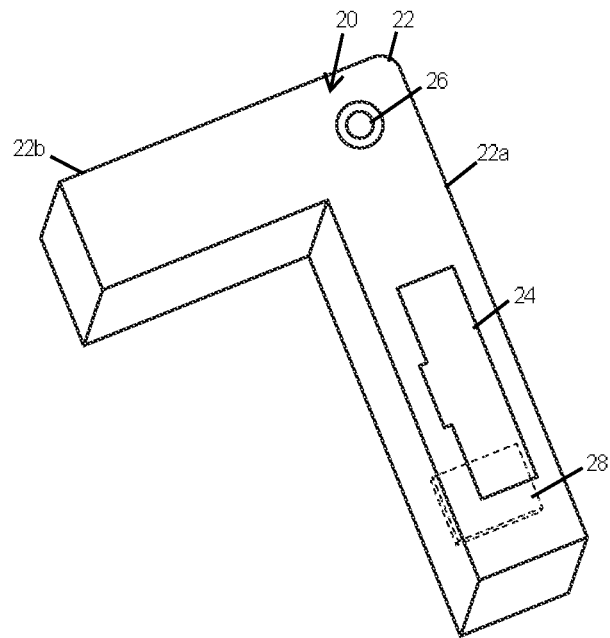
FIG. 2 is an isometric view of the transmitter assembly 20 showing a transmitter sensor 28 embedded within a transmitter housing 22.

Referring now to the drawings, where the present invention is generally referred to with numeral 10, it can be observed that it basically includes a transmitter assembly 20, a receiver assembly 40 and a lanyard assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The lanyard assembly 60 includes a lanyard 62. The lanyard may be made of cord, webbing, strap, nylon, polyester, or any other material known in the prior art. The lanyard 62 may be hung to a neck of a user. The transmitter assembly 20 includes a transmitter housing 22 and a transmitter sensor 28. The transmitter housing 22 may include a vertical member 22a and a horizontal member 22b. The vertical member 22a may have an elongated cuboid shape. The horizontal member 22b also may have an elongated cuboid shape. A proximal end of the horizontal member 22b may be perpendicularly connected to a proximal end of the vertical member 22a. It should be understood that the vertical member 22a and the horizontal member 22b may have any other shape and configuration. The housing 22 may be made of plastic, wood, carbon fibers, a metal or any other rigid protective material. A front side of the transmitter housing 22 may include a battery compartment 24 to receive a battery therein. The battery compartment 24 may be located on a distal end of the vertical member 22a. The battery may supply electrical power to the transmitter sensor 28. The transmitter sensor 28 may be embedded within the transmitter housing 22. The transmitter sensor 28 may include a transmitter device such as a Bluetooth device, radio frequency transmitter, ultrasonic transmitter, WiFi transmitter or any other means of wireless data communication. The transmitter sensor 28 may also include a GPS to know the location of the transmitter assembly 20. A light 26 may be located on a front portion of the proximal end of the vertical member 22*a*. The light 26 may be a LED. The light 26 may indicate the status of battery of the transmitter assembly 20. The light 26 may also indicate that the transmitter sensor 28 is linked to a receiver sensor 44. The transmitter housing 22 may include a rear portion with an adhesive to adhere the housing 22 to a badge 100.

Figure 3:
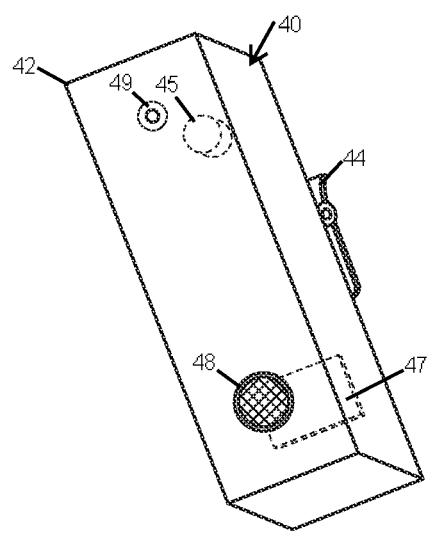
FIG. 3 is an isometric view of the receiver assembly 40 showing a receiver housing 42 having a receiver sensor 47 embedded therewithin.
Figure 4:
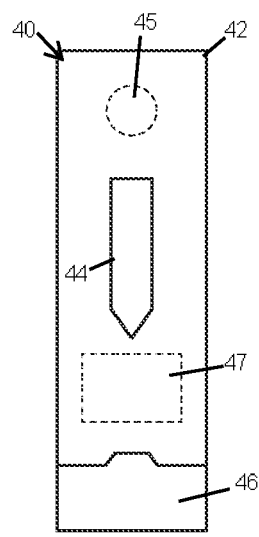
FIG. 4 is a rear view of the receiver assembly 40 showing a clip 44 attached to a rear portion of the receiver housing 42.
Figure 5:
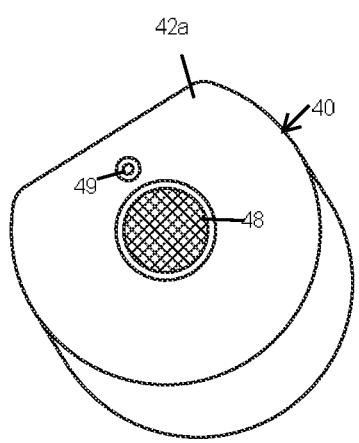
FIG. 5 is an isometric view of an alternative housing 42a of the receiver assembly 40.

The receiver assembly 40 includes a receiver housing 42 and the receiver sensor 47. The receiver housing 42 may have an elongated cuboid shape. The receiver housing 42 may be made of plastic, wood, metal, carbon fibers or any other rigid protective material. As observed in FIG. 5, it also may be suitable for the receiver assembly 40 to have an alternative housing 42*a*. The alternative housing 42*a* may include a front side and a rear side entirely flat. The alternative housing 42*a* may include a left side entirely flat. A bottom, right and top sides of the alternative housing 42*a* may be defined by a semi circumference shape. Referring now to FIG. 4, a rear side of the receiver housing 42 may include a receiver battery compartment 46 to receive an electric battery therein. The electric battery may supply electrical power to the receiver sensor 47. The receiver sensor 47 may be embedded within the receiver housing 42. The receiver sensor 47 may include a receiver device such as a Bluetooth device, radio frequency receiver, ultrasonic receiver, WiFi receiver or any other means of wireless data communication. It may be suitable for the receiver sensor 47 and the transmitter sensor 28 to have same means of wireless data communication. The receiver sensor 47 may also include a GPS to know the location of the receiver assembly 40. The receiver housing 42 also may include a clip 44 attached to a rear side of the receiver housing 42. The clip 44 may hang the receiver assembly 40 to the lanyard assembly 60 or a badge holder of a user. It also may be suitable for a user to keep the receiver assembly 40 into a pocket. Best observed in FIG. 3, the receiver housing 42 may include a second light 49 located on an upper portion of a front side of the receiver housing 42. The second light 49 may be a LED. The second light 49 may indicate the status of battery of the receiver assembly 40. The second light 49 may also indicate that the receiver sensor 47 is linked to the transmitter sensor 28.

The receiver assembly 40 also may include a speaker 48. The speaker 48 may be located on a lower portion of the front side of the receiver housing 42. It may be suitable to locate the speaker 48 anywhere else on the receiver housing 42. The speaker 48 may sound an alarm. The receiver assembly 40 also may include a motor 45 embedded within the receiver housing 42. The motor 45 may be a haptic feedback vibration motor. The motor 45 may be any other type of electric motor that produces a vibration. The motor 45 may be actuated by the alarm.

The transmitter sensor 28 and the receiver sensor 47 may communicate wirelessly one to each other. If the transmitter assembly 20 and the receiver assembly 40 are separated one to each other further than a defined distance the alarm may be triggered by the receiver sensor 47. The defined distance is set by the user. The alarm may actuate the motor 45 and the speaker 48 to indicate that the user is leaving behind the transmitter assembly 40 adhered to the badge 100.

The foregoing description conveys the best understanding of the objectives and advantages of the present invention.

Different embodiments may be made of the inventive concept of this invention. It is to be understood that all matter disclosed herein is to be interpreted merely as illustrative, and not in a limiting sense.

What is claimed is:

1. A proximity alert system for access badges, comprising:
a) a transmitter assembly including a transmitter housing, a first light, a transmitter battery, and a transmitter sensor, said transmitter housing includes an adhesive side, said adhesive side is located in a rear portion of said transmitter housing, said adhesive side is configured to adhere said transmitter housing to a predetermined surface, said transmitter battery is configured to power electronic elements of said transmitter assembly, said first light is adapted to indicate a status of said transmitter battery, said transmitter housing includes a vertical member and an horizontal member defining an L-shaped transmitter housing; and
b) a receiver assembly including a receiver housing, a second light, a receiver battery, and a receiver sensor, said receiver sensor activates an alarm, the alarm being configured to be activated when a user is at a predetermined distance separated from the transmitter assembly, said receiver battery is configured to power electronic elements of said receiver assembly, said second light indicates a status of said receiver battery, said first light and said second light are adapted to indicate if said transmitter sensor and said receiver sensor are linked.

2. The proximity alert system for access badges of claim 1, wherein said transmitter sensor communicates wirelessly with the receiver sensor.

3. The proximity alert system for access badges of claim 1, wherein said receiver housing includes a clip attached to a rear wall of said receiver housing, said clip is configured to removably attach said receiver housing to a lanyard.

4. The proximity alert system for access badges of claim 1, wherein said receiver housing includes a speaker, said speaker is activated when the alarm is activated.

5. The proximity alert system for access badges of claim 1, wherein said receiver assembly further includes a motor embedded within said receiver housing, said motor is actuated to vibrate when the alarm is activated, said motor is a haptic feedback vibration motor.

6. A proximity alert system for access badges, comprising:
a) a lanyard assembly including a lanyard;
b) a transmitter assembly including a transmitter housing, a first light, a transmitter battery, and a transmitter sensor, said transmitter housing includes an adhesive side, said adhesive side is located in a rear portion of said transmitter housing, said adhesive side is configured to adhere said transmitter housing to a predetermined surface, said transmitter battery is configured to power electronic elements of said transmitter assembly, said first light is adapted to indicate a status of said transmitter battery, said transmitter housing includes a vertical member and an horizontal member defining an L-shaped transmitter housing, said transmitter sensor is embedded within said transmitter housing; and
c) a receiver assembly including a receiver housing, said receiver housing includes a receiver sensor, a second light, a receiver battery, and a haptic feedback vibration motor embedded therewithin, said receiver housing includes said second light and a speaker located on a front side of the receiver housing, said receiver assembly includes a clip attached to the receiver housing, said clip removably attaches the receiver assembly to the lanyard, said transmitter sensor communicates wirelessly with the receiver sensor, said receiver sensor activates an alarm when the receiver assembly separates from the transmitter assembly, said alarm actuates said speaker and said haptic feedback vibration motor, said receiver battery is configured to power electronic elements of said receiver assembly, said second light indicates a status of said receiver battery, said first light and said second light are adapted to indicate if said transmitter sensor and said receiver sensor are linked.

7. A proximity alert system for access badges, consisting of:
  a) a lanyard assembly including a lanyard;
  b) a transmitter assembly including a transmitter housing and a transmitter sensor, said transmitter assembly includes a vertical member and an horizontal member, said horizontal member and said vertical member are perpendicularly connected defining an L-shaped transmitter housing, said vertical member includes a transmitter battery, said transmitter battery is configured to power electronic elements of said transmitter assembly, said vertical member includes a first light to indicate a status of the transmitter battery, a rear portion of said transmitter housing includes an adhesive, said adhesive is configured to adhere said transmitter housing to a predetermined surface, said transmitter sensor is embedded within said transmitter housing; and
  c) a receiver assembly including a receiver housing, said receiver housing having a cuboid shape, said receiver housing includes a receiver sensor and a haptic feedback vibration motor embedded therewithin, said receiver housing includes a second light and a speaker located on a front side of the receiver housing, said receiver housing having a clip attached to a rear side, said clip removably attaches said receiver assembly to the lanyard, said transmitter sensor communicates wirelessly with the receiver sensor, said receiver sensor activates an alarm when the receiver assembly separates from the transmitter assembly, said alarm actuates said speaker and said haptic feedback vibration motor, said first light and said second light are adapted to indicate if said transmitter sensor and said receiver sensor are linked.

\* \* \* \* \*